United States Patent
Rittinger et al.

(10) Patent No.: US 12,315,386 B1
(45) Date of Patent: May 27, 2025

(54) SYSTEM FOR EMULATION OF INTERACTION SCENARIOS FOR SERVICE OPERATORS OF NETWORK-BASED SERVICES

(71) Applicant: Amazon Technologies, Inc., Seattle, WA (US)

(72) Inventors: Gary Rittinger, Kent, WA (US); Gabriel Marcelo Fusca, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/331,564

(22) Filed: Jun. 8, 2023

(51) Int. Cl.
*G09B 19/00* (2006.01)

(52) U.S. Cl.
CPC ................ *G09B 19/0053* (2013.01)

(58) Field of Classification Search
CPC ................................. G09B 19/0053
See application file for complete search history.

(56) References Cited

U.S. PATENT DOCUMENTS

| | | | | |
|---|---|---|---|---|
| 10,600,335 | B1* | 3/2020 | Donovan | G09B 7/04 |
| 2006/0253310 | A1* | 11/2006 | Fuchs | G09B 7/02 705/7.42 |
| 2013/0089851 | A1* | 4/2013 | Drane | G09B 19/0038 434/362 |
| 2022/0005373 | A1* | 1/2022 | Nelson | G09B 19/0053 |

* cited by examiner

*Primary Examiner* — Eddy Saint-Vil

(74) *Attorney, Agent, or Firm* — Knobbe, Martens, Olson & Bear, LLP

(57) ABSTRACT

The present disclosure relates to systems and methods for providing a network-based service (e.g., network service) for training service operators of the network services. More specifically, the system can generate various training scenarios that the service operators can perform a service functionality computation. The system also modifies one or more attributes of the training scenarios to render an error when the service operator performs the service functionality computation. Upon detecting the error, the service operator can perform one or more corrective actions to resolve the error. The system can analyze the result of corrective actions performed by the service operator and continuously modifies the scenario that the service operator can continuously perform the service functionality computation and determine the corrective actions.

23 Claims, 10 Drawing Sheets

| ATTRIBUTE | EXPECTED VALUE | ACTUAL VALUE | VALIDATION RESULT | COMMENTS |
|---|---|---|---|---|
| BILL TYPE | ANNIVERSARY | ANNIVERSARY | PASSED | NONE |
| ACCOUNT ID | 37408 | 37408 | PASSED | NONE |
| INVOICE ID | A1 | A1 | PASSED | NONE |
| BILL AMOUNT | 20919.00 | 20919.00 | PASSED | NONE |
| CHARGE AMOUNT | 19001.00 | 19000.00 | FAILED | CHARGE AMOUNT DOES NOT MATCH EXPECTED: 19001.00 ACTUAL: 19000.00 |
| TAX AMOUNT | 1919.00 | 1919.00 | PASSED | NONE |
| CREDIT AMOUNT | 0.00 | 0.00 | PASSED | NONE |

*Fig. 2D.*

SYSTEM FOR EMULATION OF INTERACTION SCENARIOS FOR SERVICE OPERATORS OF NETWORK-BASED SERVICES

BACKGROUND

Generally described, external computing devices and communication networks can be utilized to exchange data and/or information. In a common application, an external computing device can request content from another external computing device via the communication network. For example, a user having access to an external computing device can utilize a software application to request content or access network-hosed applications/functionality from an external computing device via the network (e.g., the Internet). Additionally, the external computing device can collect or generate information and provide the collected information to a network-based customer computing device for further processing or analysis. The external computing device can be referred to as a customer computing device.

In some embodiments, a network service provider can provide various types of network-based services that are configurable to execute tasks based on inputs from the customer computing device. In some scenarios, it may be possible for a customer or user to configure the network-based services by utilizing the customer computing device. In certain scenarios, the network-based services can provide a network-based service management service to identify the one or more services requested from the customer. In some embodiments, the network service provider can provide a configuration process for the customer to implement the identified services.

In some applications, the network service provider can include a service operator, such as a service operator for a network-based service, for processing and managing the activity of the network service users. Illustratively, one or more service operators can manage the network service usage or activity of individual service users. For example, the service operator can detect an issue associated with the individual network-based service, and upon detecting the issue, the service operator can perform a specific procedure or protocol to solve the issue. In some embodiments, the network service provider can implement additional services or components to train the service operators. Illustratively, the network service provider can provide a training environment by generating a plurality of training scenarios. Then, the service operator can be trained by analyzing communications and information, identifying issues related to the network-based service, and performing corrective actions to resolve the issues. In accordance with this approach, the training of the service operators can be embodied as a training management component for providing and analyzing the training of service operators.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 2D depicts an example of a billing service computation report;

DETAILED DESCRIPTION

Figure 1A:
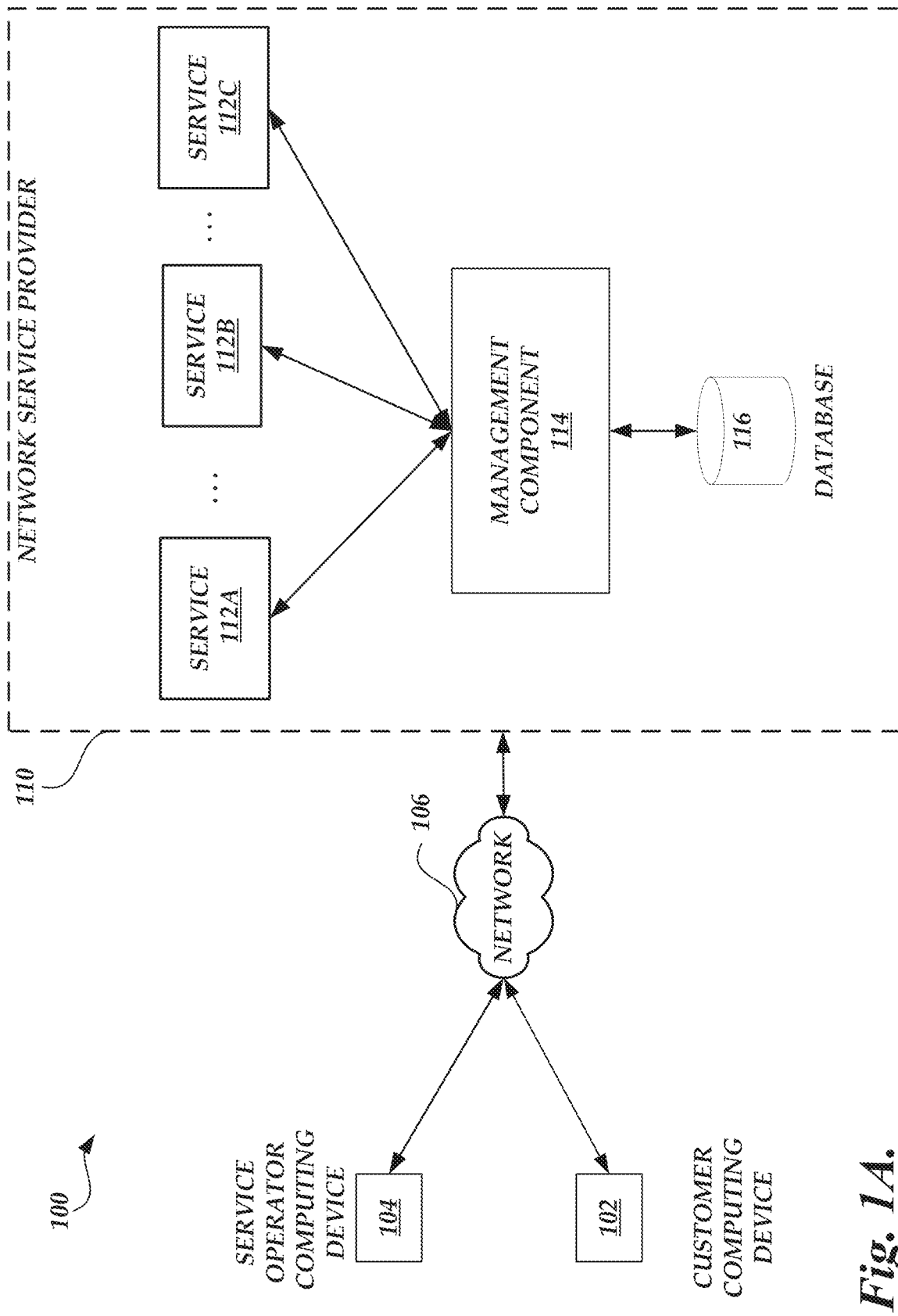
FIG. 1A depicts a block diagram of a network system that includes one or more computing devices, a network service provider, a management component, services in different regions, and a database according to one embodiment.

Aspects of the present disclosure relate to systems and methods for providing a network-based service (e.g., network service) for training service operators. More specifically, the system can generate various training scenarios in that the service operators can perform one or more functions associated with the network-based services based on information and interaction provided as part of the training scenarios. The scenarios can be related to the functionality of the service and also can be related to customer provided feedback associated with the usage of the service. The scenarios can be based on the usage of the services by the customer and/or historical service operator data related to the service functionality computation. The scenarios also can be provided as hypothetical scenarios or variations based on historical event data. The present disclosure does not limit the types of scenario.

Generally described, the service operators can refer to a person or entity responsible for processing and managing activities associated with the usage of the network services provided by the network service provider. Additionally, service operators can also refer to an artificially intelligent system configured to process and manage the activities associated with the usage of the network services or hybrid systems combing human individuals and machine-learned based systems. The present disclosure does not limit the types of the service operator. In accordance with the illustrative embodiment, the system is configurable based on the modification of one or more attributes of training scenarios emulated or otherwise provided to the service operators. Illustratively, the system can specifically modify or introduce attributes to the system to create scenarios that render at least one error for processing by the service operator performing a service functionality computation. Still further, in some applications, the attributes can be configured to create scenarios in which the error is not recoverable or in which the scenario will not result in a successful transaction or completion of a transaction. The service functionality can generally refer to one or more computations to perform tasks associated with providing the service. For example, if the service is related to billing, the service functionality can be related to billing computations. This example is merely illustrated as example purpose, and the present disclosure does not limit the type of services.

Upon detecting the error, the service operator can perform one or more corrective actions in an attempt to resolve the error. In some embodiments, the service operator can perform the corrective actions by referencing references or troubleshooting documents provided by the network service provider. The system can analyze the result of corrective actions performed by the service operator and continuously modify the scenario so that the service operator can continuously perform the actions or generate responsive communications and determine the corrective actions.

In some aspects of the present disclosure, the system can provide training scenarios that can be utilized to facilitate training the service operators. Illustratively, the system continuously generates various training scenarios, and the service operators can be trained by continuously performing the functionality of the service by using the generated scenarios. To continuously generate the different training scenarios, the system and method can use a training scenario mutation platform. The training scenario mutation platform can dynamically provide specific, individual training scenarios or environments by dynamically modifying one or more attributes of the scenarios. Such training scenarios may be implemented in a manner by creating scenarios based on real-world data, such as the transaction history of customers (e.g., usage of customers) and/or computation or transaction history of the service operators. Generally, each scenario can include one or more partial scenarios, and these partial scenarios can refer to as attributes of the scenario. For example, a scenario can include attributes such as service user account information, subscription, service pricing plan, tax information, etc.

For the purpose of illustrated examples, the training scenario can be that: a person decides to use a load balancing service to distribute traffic across multiple EC2 instances and improve the reliability and scalability of the person's application. To set up the load balancing service, the person creates a new load balancer in the network based service and configures it with the necessary settings, such as the protocol, port, and health check configuration. The person then associates the load balancer with the EC2 instances and configures the target groups that specify which instances should receive traffic. When the person set up the load balancing service, the network service provider provided an offer to discount the subscription fee for three months if the person committed at least one-year of subscription. In addition, the person lives in London. In this scenario, there are various partial scenarios, such as the type of network service ("load balancer"), configuration ("with EC2 instances"), usage ("traffic"), service account information (e.g., "offer," "subscription," "discount the subscription fee"), and geographic information ("London"). In some embodiments, each of the partial scenarios can be associated as an attribute of the training scenario. Thus, modifying the attribute can correspond to modifying the partial scenario. In this present disclosure, even though one or more example embodiments are described by referencing a specific service, these descriptions are merely provided as example purposes, and the present disclosure does not limit the type of services provided by the network service provider.

In accordance with one or more aspects of the present disclosure, the network service provider can implement a service training management component to train the service operators. The service training management component can generate training environments that can provide training scenarios for the service operators to perform the computation of the service functionality. For example, the training environment can include individual user accounts and usage information for using the service and a scenario associated with the usage of the service. For example, referencing the above-illustrated scenario, the user account information can be the payment instrument, geographic region, payment currency, etc. Then, the service operator can perform the service functionality computation using the training scenario and user account information.

In some aspects, the service training management component may include a mutation platform to generate various training scenarios based on modifications to selected attributes utilized to generate or execute the training scenarios. In some embodiments, the service training management component may generate the training scenarios by adding or modifying the attributes of the scenarios. In some embodiments, each of these scenarios may cause one or more errors when the service operator performs the service functionality computation. For example, the service training management component may include a scenario by utilizing data recalled from a database (e.g., database) identified as providing an error and including the recalled data, such as expiring one or more offers, included in an original billing data of a customer that is being used as the training scenario. In this example, when the service operator is performing the service functionality computation in the training scenario, the service functionality computation may generate an error due to the expired offer.

In some aspects, the service training management component may track or monitor the service operators after the service operators detect the error. For example, after detecting the service functionality computation issues, the service operators may perform corrective actions, such as standard procedures or protocols provided by the network service provider. The service training management component may analyze the corrective actions and characterize the actions to generate feedback. In some embodiments, the system may further generate training scenarios by mutating one or more training scenario attributes based on the characterized actions or feedback.

In some aspects, the service training management component may continuously update one or more attributes of the training scenarios used to create the training scenarios. For example, the service training management component, by using the training scenario mutation platform, may change one or more attributes of the scenarios. In some embodiments, the service training management component may modify the one or more attributes of the scenarios when the service operators resolve error(s) detected during the service functionality computation. The service operators can then provide these modified attributes as an updated training scenario. For example, if the service is related to billing and when the service operators resolve the computation (e.g., billing computation) issues caused by the expired offer, the service training management component may modify the training scenario by removing the pricing plan. Then, the service training management component may continue to track and monitor the service operators when the service operators detect the issue and perform corrective actions to resolve the detected issue.

In some aspects of the present disclosure, each of the created training environments and monitoring results of the service operators in resolving the computation issues in these environments can be stored in the database of the network service provider. These stored data can be provided as metadata and can further be utilized to provide as reference for troubleshooting or solving issues in the real world.

Generally, training network service operators are an increasingly important aspect for the network service providers. However, training the service operators can present significant technical challenges for the network service providers. More specifically, the network service provider may not be able to efficiently or effectively train the service operators. For example, to train the service operators, the administrator (e.g., manger, developer, etc.) of the network service provider may manually create training scenarios. In addition, in the context of billing network-based service, the service operators may perform the service functionality computations included in the scenario, and the network service provider may manually analyze the results and generate feedback. Such service functionality computations generally required a review of data and communications, identification of errors or potential for errors, and formation of error corrections or adjustments. For example, if the network service provider provides a clouding computing service with more than 100 million subscribers, the traditional network service provider cannot practically create training scenarios associated with each subscriber. In one aspect, the traditional training of the service operators can be limited by region. For example, if the network service provider provides a billing service, a training scenario can be limited to a specific region because other regions may require different scenarios due to the different billing computing requirements, such as different offers in these regions, different tax rates, etc. In another aspect, the traditional training of the service operators has a limitation in providing the training in a dynamic nature. For example, when a service operator performs a service functionality computation using the training scenario, the traditional training environment may not provide any further training scenarios. Thus, the service operators have a limitation in their scope of training.

To address at least a portion of the above-described deficiencies, one or more aspects of the present disclosure correspond to systems and methods for providing service operators training by automatically and dynamically generating training environments and analyzing the training results. Illustratively, the system may generate training scenarios based on each service operator's attributes. For example, if a service operator is located in region A and performs the service functionality computation for the customers in region A, the system may include attributes associated with billing in the region A, such as by adapting the tax rate of the region A or including any offer or price plan associated in the region A. In one aspect, the system may continuously provide the training scenarios by dynamically modifying one or more attributes of the scenario. For example, once the service operator completes its service functionality computation in one scenario, the system may provide another scenario by changing the attribute of the completed scenario.

Illustratively, the network service provider may include a service training management component. The service training management component can be utilized to train service operators by generating various training scenarios, dynamically modifying the training scenarios, and analyzing the training results of each service operator.

In some aspects of the present disclosure, the service training management component may identify attributes of a scenario that can cause an issue or failure in service functionality computation performed by the service operator. For example, the attribute of the scenario (e.g., billing scenario) can be a "removing the price plan." In some aspects of the present disclosure, the service training management component may generate training scenario mutation. For example, the service training management component may identify successful historical service functionality computation data, such that a service operator successfully computed a correct amount of billing. In these aspects, the service training management component may combine the scenario with the historical billing data so that the combined billing data may result in failure when the service operator performs the service functionality computation. For example, the combined data can be the billing information used in the successful historical service functionality computation data with the scenario of the offer expiration, so the combined billing information may provide an issue when the service operator performs the service functionality computation. In some aspects, the service training management component may continuously generate the training scenarios by combining the training scenario mutations and the scenarios. Thus, the generated scenarios can be stored as metadata.

In some aspects of the present disclosure, the service training management component can analyze the individual service operator's performance based on criteria. Illustratively, the service training management component may include criteria. In this illustration, the service training management component may include criteria provided by the network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application.

In some aspects of the present disclosure, the service training management component can generate the training scenarios by further generating the user account information. Illustratively, the service training management component may obtain a plurality of user accounts associated with a usage of services and parse the account information to remove personally identifiable information. In these aspects, the obtained account information can be replicated, and each replicated account information can be processed with the training scenarios during the service operator training.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1A depicts a block diagram of an embodiment of the system 100. The system 100 can include a network 106, the network connecting a number of customer computing devices 102, service operator computing devices 104, and network-based services 112. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 106, as depicted in FIG. 1A, connects the devices and modules of the system. The network can connect any number of devices. In some embodiments, a network service provider provides network-based services to customer computing devices via a network 106. A network service provider 110 implements network-based services and refers to a large, shared pool of network-accessible computing resources (such as compute, storage, or networking resources, applications, or services), which may be virtualized or bare-metal. The network service provider 110 can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

The customer computing device 102 in FIG. 1A can connect to the network and the network service provider 110. The customer computing device 102 may be representative of a computing network associated with a plurality of customer computing devices. Solely for illustration purposes, customer computing device 102 represents a customer's action to access to services 112. Generally, the customer computing device 102 attempts to access and use the services 112 by identifying service 112. The customer computing device 102 may also receive account information, including billing information. The service operator computing device 104 can also be connected to the network service provider 110 via the network 106. In some embodiments, the service operator computing device 104 can perform service functionality provided by the network service provider 110 to the customer computing device 102. In some embodiments, the service operator computing device 104 can receive one or more training scenarios and provide the training scenario to the service operator.

The customer computing device 102 can be configured to transmit a request to the network service provider 110 to illustratively access one or more network-based services via the network 106. The customer computing device 102 can be configured to have at least one processor. That processor can be in communication with the memory for maintaining computer-executable instructions. The customer computing device 102 may be physical or virtual. The customer computing devices 102 may be mobile devices, personal computers, servers, or other types of devices. The customer computing device 102 may have a display and input devices through which a user can interact with the user-interface component.

Illustratively, the network service provider 110 can include a plurality of network-based services that can provide functionality responsive to configurations/requests transmitted by the customer computing devices 102, such as in the implementation of a set of microservices that are configured to provide underlying functionality to applications hosted by a service provider. As illustrated in FIG. 1A, the network service provider 110 can include a set of network-based services 112A, 112B, 112C, etc. (generally referred to as network-based services, network services, or services). Illustratively, each service can be configured with defined functions that can be accessed based on communication or executable commands. One or more services 112 can be accessed directly with communications transited by the customer computing device 102 via various interfaces. Additionally, one or more services 112 may also be considered dependent services or complimentary services that are accessed based on communications or commands from other services. Such dependent or complimentary services 112 may or may not be directly accessible to communications from the customer computing device 102 (even if the execution of the dependent or complimentary services is being performed on behalf of the customer). Without limitation, the services 112 can include virtualization services, streaming services, query processing services, data processing services, data storage or warehousing services, analytics services, database services, monitoring services, security services, content delivery services, and the like.

For purposes of the present disclosure, as described herein, each of the services 112A, 112B, 112C can implement some form of network infrastructure configuration process as part of the service configuration process. The network infrastructure configuration can refer to setting network policies, flows, controls, or managing cloud computing infrastructure to access and use the service. In addition, each service can have its own attributes and required values to be configured in an infrastructure configuration process. Illustratively, the service 112 can be automatically configured by performing the infrastructure configuration process corresponding to the service, such as with necessary attributes, to allow the customer to use the service 112.

The network service provider 110 further includes a service management component 114. In some embodiments, the service management component 114 can identify one or more services 112A, 112B, 112C and also account information associated with usage of the services 112A, 112B, 112C. In some embodiments, the service management component 114 tracks or monitors the usage of the services 112A, 112B, 112C and store the result of tracking and monitoring of the usage into the database 116. In some embodiments, the service management component 114 records and updates the usage of the services 112A, 112B, 112C periodically. In these embodiments, the usage stored in the database 116 can be utilized to perform the service functionality computation for each user. In addition, the customer, by utilizing the customer computing device 102, may access to the database 116 to determine the history usage of the services 112A, 112B, 112C. In one embodiment, the service management component 114 automatically provides the service usage information when the user login to the user's account that provides the services 112A, 112B, 112C.

Figure 1B:
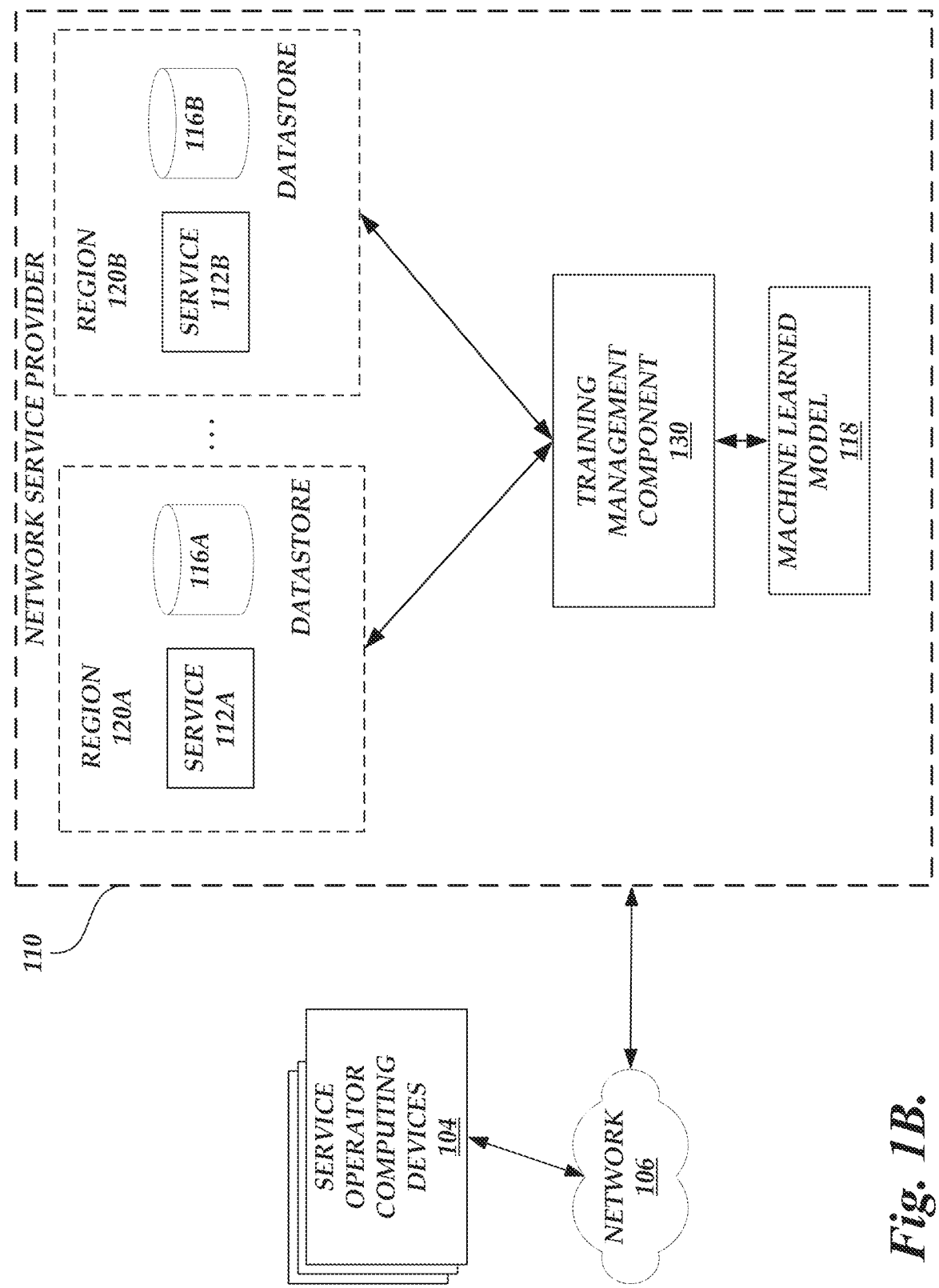
FIG. 1B depicts a block diagram of a network system that includes one or more computing devices, a network service provider, a training management component, machine learned model, and services in different regions.

FIG. 1B depicts a block diagram of an embodiment of a system to train service operators. As depicted in FIG. 1B, the network service provider 110 can include services 112A, 112B deployed in regions 120A, 120B. Each region 120A, 120B can provide the services 112A, 112B, and this service in each region can be the same service or a different service. The present disclosure does not limit the types of services provided in the region. Each region 120A, 120B, also includes database 116A, 116B, respectively. The database 116A, 116B can store information associated with billing of the service usage in each database 116A, 116B. For example, the databases 116A, 116B can include a price plan for using the services in each region and/or tax rate in each region. This stored information can be utilized for generating the training scenario specific to the service operators and performing service functionality computation in each region.

As shown in FIG. 1B, the network service provider 110 can also include the training management component 130. The training management component 130 can provide training environments for training the service operators. Also, the training management component 130 can analyze the training results of the service operators.

In some embodiments, the training management component 130 can generate training scenarios. The service operators can use the training scenario to perform the service functionality computation, detect one or more attributes that cause error or failure in service functionality computation, and perform corrective actions. In some embodiments, the training scenario can be composed of various partial scenarios. In some embodiments, the partial scenarios that cause an error or failure for the service operator in performing the service functionality computation can be characterized as variable scenarios. For example, the variable scenarios can include but are not limited to "no payment instrument on file," "resuming billing for a skip account," "account issues on tax and billing," "expired offer," "pricing plan removal," etc. In some embodiments, the one or more variable scenarios can be included in the training scenario and cause an error or issue when the service operator performs the service functionality computation based on the training scenario.

In some embodiments, the training management component 130 can perform training scenario mutation. The training scenario mutation can generate scenarios by varying one or attribute of the scenarios. For example, the training management component 130 may replicate a training scenario and mutate the scenario by changing one or more attributes of the scenario. For example, a training scenario can be replicated, and the attribute of the scenario (for example, in a billing service), such as "pricing plan removal," can be added to the replicated scenario. In this example, modifying the scenario by adding the "pricing plan removal" may generate an error when the service operator performs the service functionality computation in this scenario.

In some embodiments, the training management component 130 may perform training scenario mutation by obtaining the replicated scenario from the historical usage of the service customer and/or historical service usage scenarios provided to the service operators. For example, if a service operator successfully performs a service functionality computation of a scenario, this scenario can be replicated. Then, the training management component 130 can generate training scenarios by mutating the scenario. For example, the training management component 130 can modify one or more attributes of the scenario. In some embodiments, the training management component 130 may mutate the scenario to cause an issue or failure during the service functionality computation performed by the service operator. For example, the training management component 130 can generate a training scenario by removing the "pricing plan" previously included in the scenario. Thus, when the service operator is performing the service functionality computation using the training scenario, the service operator may detect an issue or error due to the removed pricing plan.

In some embodiments, the training management component 130 dynamically updates attribute in the training scenario. In these embodiments, the training management component 130 continuously modifies the attributes. In some embodiments, the training management component 130 may continuously modify the attributes based at least on the results of the service operator for attempting to resolve the issue during service functionality computation. For example, a service operator may have attempted 3 times and failed to complete the service functionality computation in a training scenario that includes "pricing plan removal." In this example, the training management component 130 may mutate the training scenario by adding the pricing plan and removing a service user account billing method, such as "no payment instrument on file." Then, the service operator can continuously perform the service functionality computation using the newly generated training scenario.

In some embodiments, the training management component 130 can mutate the training scenario by providing customized input. In these embodiments, the attributes in the scenario can be partitioned as universal attribute and a customizable attribute. For example, in a billing service, the universal attribute can include the attributes included in all use cases related to the service, such that if the service requires a connection fee regardless of price plan or offer, the connection fee can be the universal attribute. Further, in this example, the customizable attribute can include the attributes that should be customized. For example, if the price plan is different across the regions, the different price plans should be included in the attributes of scenarios respective to the region.

In some embodiments, the training management component 130 monitors the training scenario mutation by tracking changes in the attributes of the training scenario.

In some embodiments, the training management component 130 may generate various account profiles that can be used when the service operators perform the service functionality computation. In these embodiments, the training management component 130 may obtain account information from the network service provider 110. The account information may include all of the necessary account information to perform the service functionality computation based on the generated scenarios. For example, in a billing service, the necessary account information can include account identification, tax rate, billing cycle, service price plan, offer, etc. In some embodiments, the training management component 130 can generate account information and replicate it into a certain number of accounts. For example, the training management component 130 may obtain an account from the network service provider 110 and replicate the account into more than one replicated account. Each replicated account can be associated with a different scenario, and the service operator can perform the service functionality computation by using the replicated accounts and the generated scenarios. For example, if an account is replicated into 10 accounts, each replicated account can be utilized as the account information for 10 different scenarios.

In some embodiments, the training management component 130 may monitor the analysis behavior of the service operators and characterize the monitored results. The analysis behavior can refer to corrective action(s) performed by the service operator to resolve an issue or error detected during the service functionality computation. For example, the training management component 130 may monitor the corrective actions performed by the service operator by determining service functionality computation time, the number of attempts to detect the issue, steps to resolve the issue, etc. In some embodiments, the training management component 130 may track the corrective actions performed by the service operators based on criteria. Illustratively, the service training management component may include criteria defined by the network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application. In some embodiments, the training management component 130 may characterize the monitored results to generate feedback. For example, if the training management component 130 includes answers to be performed by the service operator for resolving the errors during the service functionality computation, the training management component 130 may provide a feedback to the service operators. In another example, the training management component 130 may update the training scenario based on the monitoring results. For example, if the service operator successfully resolved the issue identified during the service functionality computation, the training management component 130 may modify the training scenario to render another computation issue when the service operator reperforms the computation. In another example, the training management component 130 can continuously generate training scenario that cannot be resolved by the service operators. In this example, the training management component 130 can continuously monitor the behavior of the service operators for attempting to resolve the issues in the service functionality computation.

The network service provider 110 further includes a machine learned model 118. The machine learned model 118 could be used to assist the training management component 130 in generating scenarios and analyzing the service operators' analysis behavior. Illustratively, the machine learned model 118 generates the scenarios based on processing the historical billing information associated with one or more services. A number of different types of algorithms may be used by the machine learned model 118 to generate the models. The algorithms can include conversational algorithms, dialogue algorithms, and any type of algorithms according to the embodiments as disclosed herein. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learned model 118. Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms. In some embodiments, the machine learned model 118 can vary the training scenarios to present a "fresh" view to reduce the chance of cheating/copying prior results. The machine learned model 118 also can track each service operator behavior in attempting to resolve an error detected during service functionality computation and present the scenarios in out of sequence, and monitors the service operator for resolving errors detected during service functionality computing in the presented scenarios.

As shown in FIG. 1B, the service operators can utilize the service operator computing devices 104 to receive the training (e.g., training scenarios). The service operator computing devices 104 may be separate stand-alone computing devices. The service operator computing devices 104 can connect to the network service provider 110. Solely for purposes of illustration, service operator computing devices 104 may access one or more services 112 maintained by network-based service 110. The service operator computing devices 104 are configured to have at least one processor. That processor can be in communication with a memory for maintaining computer-executable instructions. The service operator computing devices 104 may be physical or virtual. The computing devices may be mobile devices, personal computers, servers, or other types of devices. The service operator computing devices 104 may have a display and input devices through which a user can interact with the user-interface component. In some embodiments, a third party can utilize the computing device 104 to receive the training. The service operator computing devices 104 can connect with the network service provider via the network 106 or directly connect to the training management component 130. The present disclosure does not limit the types of connection between the service operator computing devices 104 and the network service provider 110.

Figure 2A:
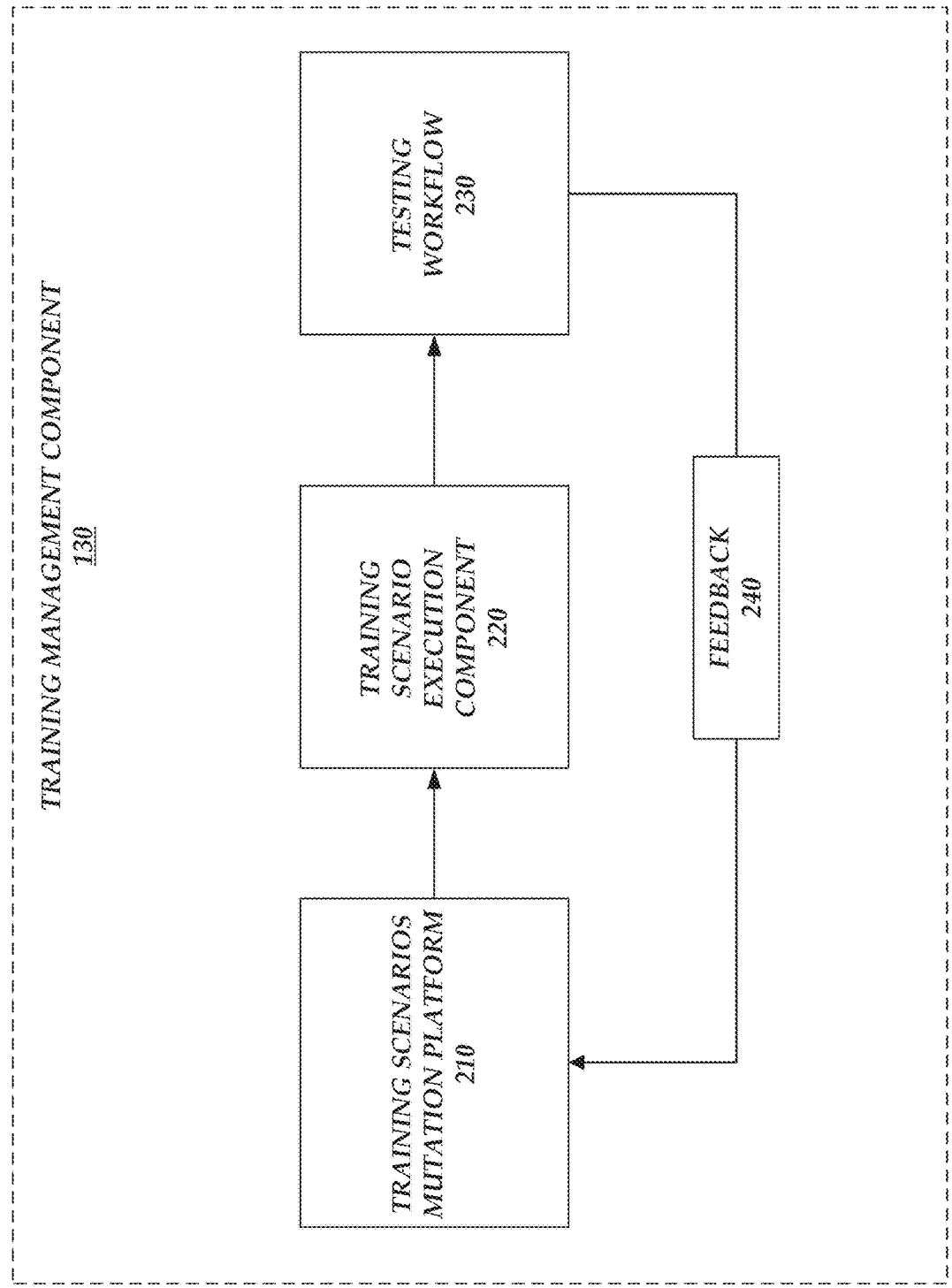
FIG. 2A depicts a block diagram of an embodiment of the training management component.

FIG. 2A depicts a block diagram of an embodiment of the training management component 130. As depicted in FIG. 2A, the training management component 130 can include a training scenario mutation platform 210, training scenario execution component 220, and testing workflow 230. In some embodiments, the testing workflow 230 can provide feedback 240 to the training scenario mutation platform 210. In some embodiments, the training scenario mutation platform 210 generates one or more training scenarios. In these embodiments, the training scenario can be composed of partial scenarios, and these partial scenarios can refer to as attributes. Thus, each attribute can be modified, and the modification can render the training scenario that causes an issue or error during service functionality computation by the service operator. For example, if the training scenario includes a specific pricing plan for using a network service, the attributes related to specific pricing plan can be removed. In this example, when the service operator performs service functionality computation, it may cause a failure because there is no pricing plan.

In some embodiments, the training scenario mutation platform 210 may continuously generate training scenarios by mutating the existing training scenarios. The training scenario mutation can generate scenarios by varying one or more attributes of the scenarios. For example, the training scenario mutation platform 210 may replicate a training scenario and mutate one or more attributes of the replicated scenario. For example, a training scenario can be replicated and the attributes of the scenario, such as "pricing plan removal" can be added to the replicated scenario. In this example, adding the attribute may require modifying the attribute of the replicated scenario, where the attribute is related to the pricing plan. In some embodiments, the training scenario mutation platform 210 mutates the training scenario based at least on the feedback 240. For example, the feedback 240 may include that a service operator has attempted 3 times and failed to complete the service functionality computation in a training scenario that includes "pricing plan removal." In this example, the training scenario mutation platform 210 may mutate the training scenario by adding the pricing plan and removing a service user account billing method, such as "no payment instrument on file." Then, the service operator can continuously perform the service functionality computation using the newly generated training scenario.

In some embodiments, the training scenario mutation platform 210 may perform training scenario mutation by obtaining the replicated scenario from the historical usage of the service customer and/or historical service usage scenarios provided to the service operators. For example, if a service operator successfully performed a service functionality computation of a scenario, this scenario can be replicated. Then, the training scenario mutation platform 210 can generate training scenarios by mutating the scenario. For example, the training scenario mutation platform 210 can modify one or more attributes of the scenario (e.g., scenarios performed by the service operators in real scenarios).

In some embodiments, the training scenario mutation platform 210 dynamically updates attribute in the training scenario. For example, when a service operator attempts 3 times and fails to complete the service functionality computation, the training scenario mutation platform 210 may change another attribute of the training scenarios. For example, when a training scenario includes a scenario, such as "pricing plan removal," the service operator may fail to complete the service functionality computation. In this example, the training scenario mutation platform 210 can modify attributes to add the pricing plan in the training scenario and modify another attribute to add a scenario, such as "no payment instrument on file." These examples are provided merely as examples, and the training scenario mutation platform 210 can continuously change the training scenario by mutating its attributes to modify the partial scenario of the training scenario.

In some embodiments, the training scenario mutation platform 210 can mutate the training scenario by providing customized input. In these embodiments, the attributes in the scenario can be partitioned as universal attribute and a customizable attribute. For example, in a billing service, the universal attribute can include the attributes included in all use cases related to the service, such that if the service requires a connection fee regardless of price plan or offer, the connection fee can be the universal attribute. Further, in this example, the customizable attribute can include the attributes that should be customized. For example, if the price plan is different across the regions, the different price plans should be included in the attributes of scenarios respective to the region.

In some embodiments, the training scenario mutation platform 210 monitors the training scenario mutation by tracking changes in the attributes of the training scenario.

As shown in FIG. 2A, the training management component 130 can also include training scenario execution component 220. In some embodiments, the training scenario execution component 220 obtains training scenarios from the training scenario mutation platform 210 and executes the training scenario. In some embodiments, the training scenario execution component 220 may utilize other services such as a database service, an object storage service, etc. (not shown in FIG. 2A). These components may be implemented as software, hardware, or a combination of both using one or more multiple computing devices located at one or more multiple locations provided by the network service provider 110.

The training management component 130 can also include a testing workflow 230. In some embodiments, the training management component 130 can execute the workflow included in the testing workflow 230. For example, the training scenario execution component can execute an orchestrator and identify the testing workflow 230. The result of the workflow included in the testing workflow 230 can be provided as feedback 240 to the training scenario mutation platform 210.

In some embodiments, the training scenario mutation platform 210 may track or monitor the analysis behavior of the service operators. The analysis behavior can refer to the corrective action performed by the service operator to resolve an issue or error detected during the service functionality computation. For example, the training scenario mutation platform 210 may monitor the corrective actions performed by the service operator by determining service functionality computation time, the number of attempts to detect the issue, steps to resolve the billing issue, etc. In some embodiments, the training scenario mutation platform 210 may track the corrective action performed by the service operators based on criteria. Illustratively, the service training management component may include criteria defined by the network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application. In some embodiments, the testing workflow 230 provides the analysis behavior (e.g., corrective actions performed by the service operator) in the form of mean time to repair (MTTR). For example, the MTTR can represent the time the service operator corrected the issue or error detected during the service functionality computation.

Figure 2B:
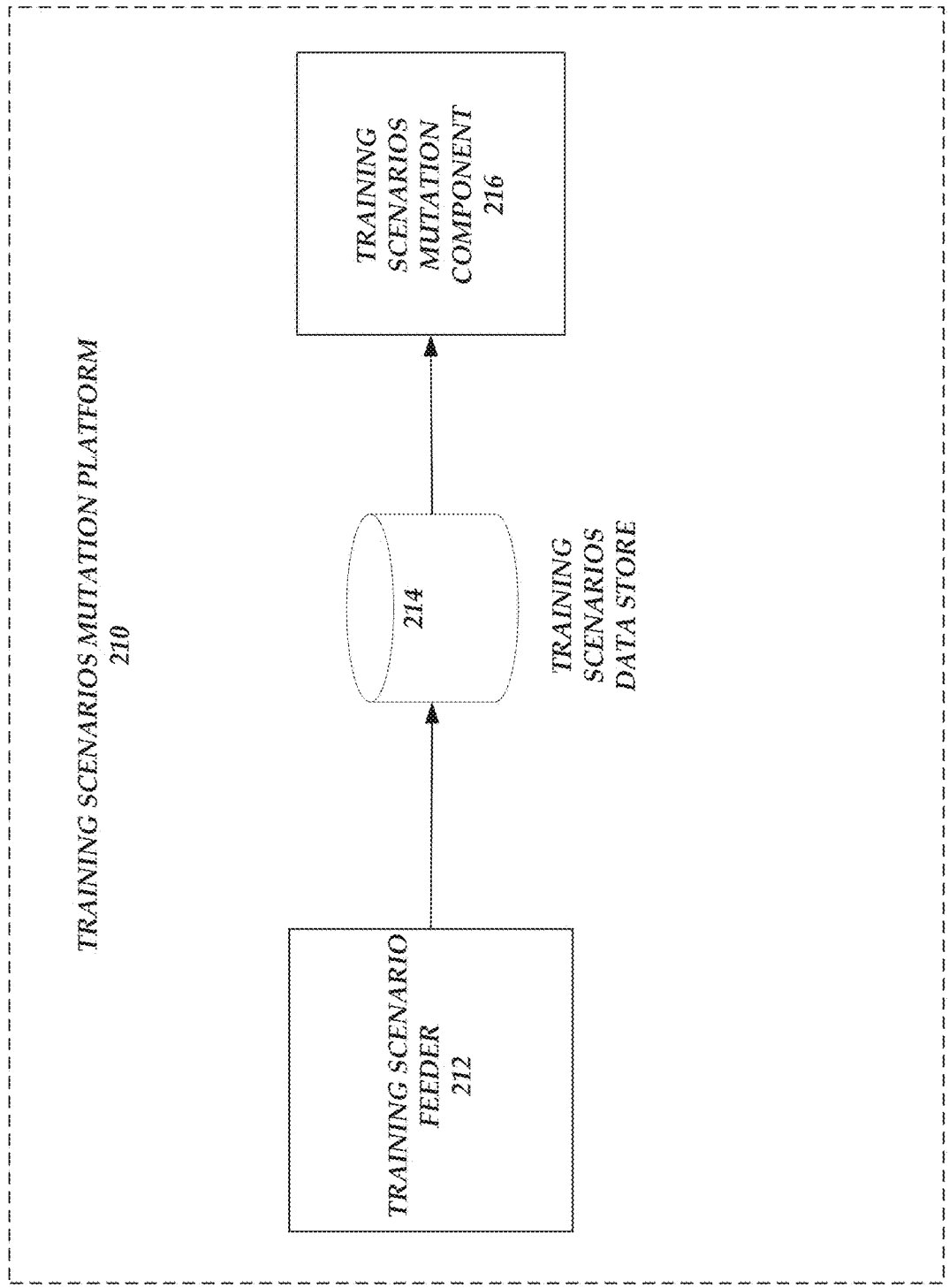
FIG. 2B depicts a block diagram of an embodiment of training scenario mutation platform.

FIG. 2B depicts a block diagram of an embodiment of the training scenario mutation platform 210. In some embodiments, an administrator (e.g., a trainer, a developer, a service manager) can provide the training scenario to the training scenario feeder 212. In some embodiments, the training management component 130 can provide real scenarios, such as the historical usage of the service customer and/or historical service usage scenarios provided to the service operators. For example, if service operators successfully performed service functionality computation of the scenarios, the training scenario feeder 212 can store the scenarios in the training scenarios data store 214. Then, the training scenarios mutation component 216 can generate training scenarios by mutating the scenario. For example, the training scenarios mutation component 216 can modify one or more attributes of the scenario. In some embodiments, the training scenarios mutation component 216 may mutate the scenario to cause an issue or failure during the service functionality computation performed by the service operator. For example, the training scenarios mutation component 216 can generate a training scenario by removing the "pricing plan" previously included in the scenario. Thus, when the service operator is performing the service functionality computation using the training scenario, the service operator may detect an issue or error due to the removed pricing plan.

In some embodiments, the training scenario feeder 212 can group the scenarios. Illustratively, a group of scenarios can be grouped and characterized as scenarios that can render an error or failure during the service functionality computation. Thus, the service operator needs to perform one or more corrective actions to resolve the error or failure. For example, these scenarios can include but are not limited to "no payment instrument on file," "resuming billing for a skip account," "account issues on tax and billing," "expired offer," "pricing plan removal," etc. In some embodiments, one or more of these scenarios can be included in the training scenario and cause an error or issue when the service operator performs the service functionality computation based on the training scenario.

FIG. 2B also includes a training scenarios data store 214. In some embodiments, the training scenarios data store 214 receives the training scenarios from the training scenario feeder 212.

In some embodiments, the training scenarios data store 214 can include expected corrective answers to be performed by the service operator for each training scenario. For example, when a scenario, "no payment instrument on file," is included in the training scenario, the expective corrective answer can be "contact service account user and receive payment instrument" or "convert the account billing as invoice." In some embodiments, the expected corrective answers can include the number of attempts for the service operator to determine the corrective answer. In some embodiments, the expected corrective answers can be that no corrective answer existed and only provide the number of attempts. In some embodiments, the expected corrective answers can specify a time duration to determine the corrective answer.

FIG. 2B further includes a training scenarios mutation component 216. The training scenarios mutation component 216 can generate scenarios by varying one or more attributes of the scenarios. For example, the training scenarios mutation component 216 may replicate a training scenario and changes one or more attribute of the replicated scenario. For example, a training scenario can be replicated, and the variable scenario, such as "pricing plan removal," can be added to the replicated scenario. In this example, adding the variable scenario may require modifying the attribute of the replicated scenario, where the attribute is related to the pricing plan.

In some embodiments, the training scenarios mutation component 216 may perform training scenario mutation by obtaining the replicated scenario from the historical usage of the service customer and/or historical service usage scenarios provided to the service operators. For example, if a service operator successfully performs a service functionality computation of a scenario, this scenario can be replicated. Then, the training scenarios mutation component 216 can generate training scenarios by mutating the scenario. For example, the training scenarios mutation component 216 can modify one or more attributes of the scenario. In some embodiments, the training scenarios mutation component 216 may mutate the scenario to cause an issue or failure during the service functionality computation performed by the service operator. For example, the training scenarios mutation component 216 can generate a training scenario by removing the "pricing plan" previously included in the scenario. Thus, when the service operator is performing the service functionality computation using the training scenario, the service operator may detect an issue or error due to the removed pricing plan.

In some embodiments, the training scenarios mutation component 216 dynamically updates the attribute in the training scenario. For example, when a service operator attempts 3 times and fails to complete the service functionality computation, the training scenarios mutation component 216 may change another attribute of the training scenarios. For example, when a training scenario includes a scenario, such as "pricing plan removal," the service operator may fail to complete the service functionality computation. In this example, the training scenarios mutation component 216 can modify attributes to add the pricing plan in the training scenario and modify other attributes to add a scenario, such as "no payment instrument on file." These examples are provided merely as examples, and the training scenarios mutation component 216 can continuously change the training scenario by mutating its attributes to modify the partial scenario of the training scenario.

In some embodiments, the training scenarios mutation component 216 can mutate the training scenario by providing a customized input. In these embodiments, the attributes in the scenario can be partitioned as universal attributes and customizable attributes. For example, the universal attribute can include the attributes included in all use cases related to the service, such that if the service requires a connection fee regardless of price plan or offer, the connection fee can be the universal attribute. The customizable attribute, for example, can include the attributes that should be customized. For example, if the price plan is different across the regions, the different price plans should be included in the attributes of scenarios in respective to the region.

In some embodiments, the training scenarios mutation component 216 monitors the training scenario mutation by tracking changes in the attributes of the training scenario.

Figure 2C:
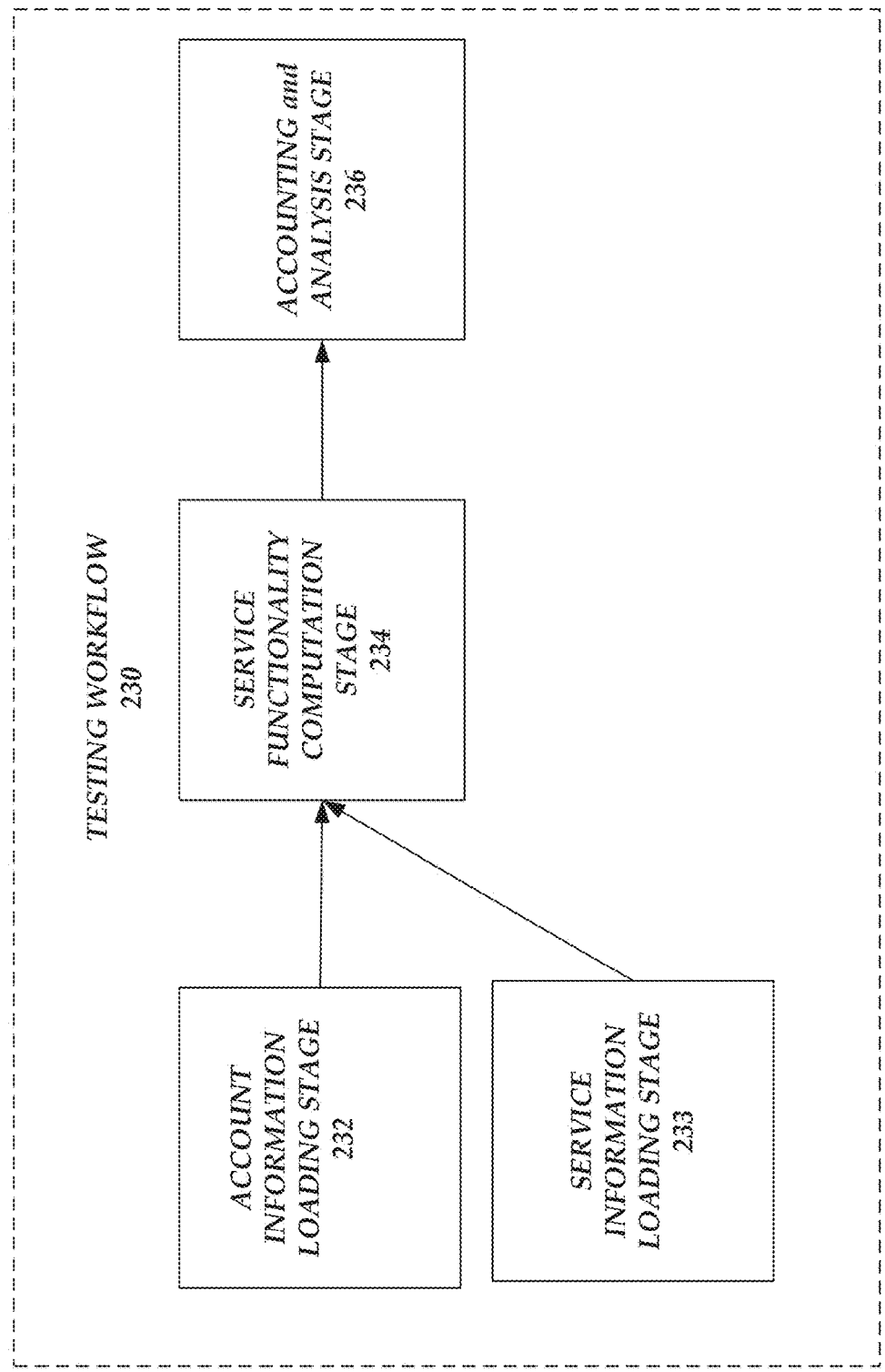
FIG. 2C depicts a block diagram of an embodiment of testing workflow.

FIG. 2C depicts a block diagram of an embodiment of the testing workflow 230. As depicted in FIG. 2C, the testing workflow 230 can include the account information loading stage 232, the service information loading state 233, the service functionality computation stage 234, and the accounting and analysis stage 236.

In some embodiments, the account information loading stage 232 may generate various account profiles that can be used when the service operators perform the service functionality computation. In these embodiments, the account information loading stage 232 may obtain account information from the network service provider 110, such that the user account information is stored in the database 116. The account information may include all of the necessary account information to perform the service functionality computation based on the generated scenarios. The necessary account information can include account identification, tax rate, billing cycle, service price plan, offer, etc. In some embodiments, the account information loading stage 232 can generate account information and replicate it into a certain number of accounts. For example, the account information loading stage 232 may obtain an account from the network service provider 110 and replicate the account into more than one replicated accounts. Each replicated account can be associated with a different scenario, and the service operator can perform the service functionality computation by using the replicated accounts and the generated scenarios.

For example, if an account is replicated into 10 accounts, each replicated account can be utilized as the account information for 10 different scenarios.

In some embodiments, the service information loading state 233 may generate services that require functionality computation by the service operators. In some embodiments, the service information loading state 233 may provide services associated with the training scenarios. Thus, the service user account information and the services associated with the training scenarios can be obtained from the account information loading stage 232 and the service information loading stage 233.

The testing workflow 230 can also include service functionality computation stage 234. In some embodiments, the service operator can perform the service functionality computation by using the training scenario and account information. In some embodiments, the service functionality computation can generate issues or errors. For example, if the training scenario includes a scenario such as "no payment instrument," an error can be occurred due to the "no payment instrument." In this example, the service operator can perform corrective actions. For example, the service operator can perform the corrective action by referencing standard operation references or troubleshooting documents provided by the network service provider 110. In some embodiments, performing the corrective action can result generating the invoicing and processing payments.

The testing workflow 230 can further include accounting and analysis stage 236. The accounting and analysis stage 236 can generate service functionality computation results by analyzing and characterizing the result of service functionality computation performed by the service operators. In some embodiments, the accounting and analysis stage 236 may monitor the behavior of the service operators and characterize the monitored results. The monitored behavior can refer to corrective action(s) performed by the service operator to resolve an issue or error detected during the service functionality computation. For example, the accounting and analysis stage 236 may monitor the corrective actions performed by the service operator by determining service functionality computation time, the number of attempts to detect the issue, steps to resolve the issue, etc.

FIG. 2D depicts an example of the service functionality computation report. In some embodiments, the service functionality computation report can be provided to the training scenario mutation platform 210. As shown in FIG. 2D, the service functionality computation report 250 may include an attribute column that specifies the data fields associated with the invoice object, an expected value column that specifies the expected data values for the data fields, an actual value column that specifies the actual data values obtained from the training scenario, a validation result column that specifies whether the expected data values correspond to the actual data values, and/or a comments column that specifies a narrative to the user regarding the validation result obtained for a particular data field associated with the invoice object. In certain examples, the validation results specified in the validation result column may include a pass and/or fail criterion that specifies whether or not the content validation of the object was successful. In other examples, the validation result column may include additional or alternate criteria such as an expected passed result, an expected failed result, an unexpected failed result, and so on.

Figure 3:
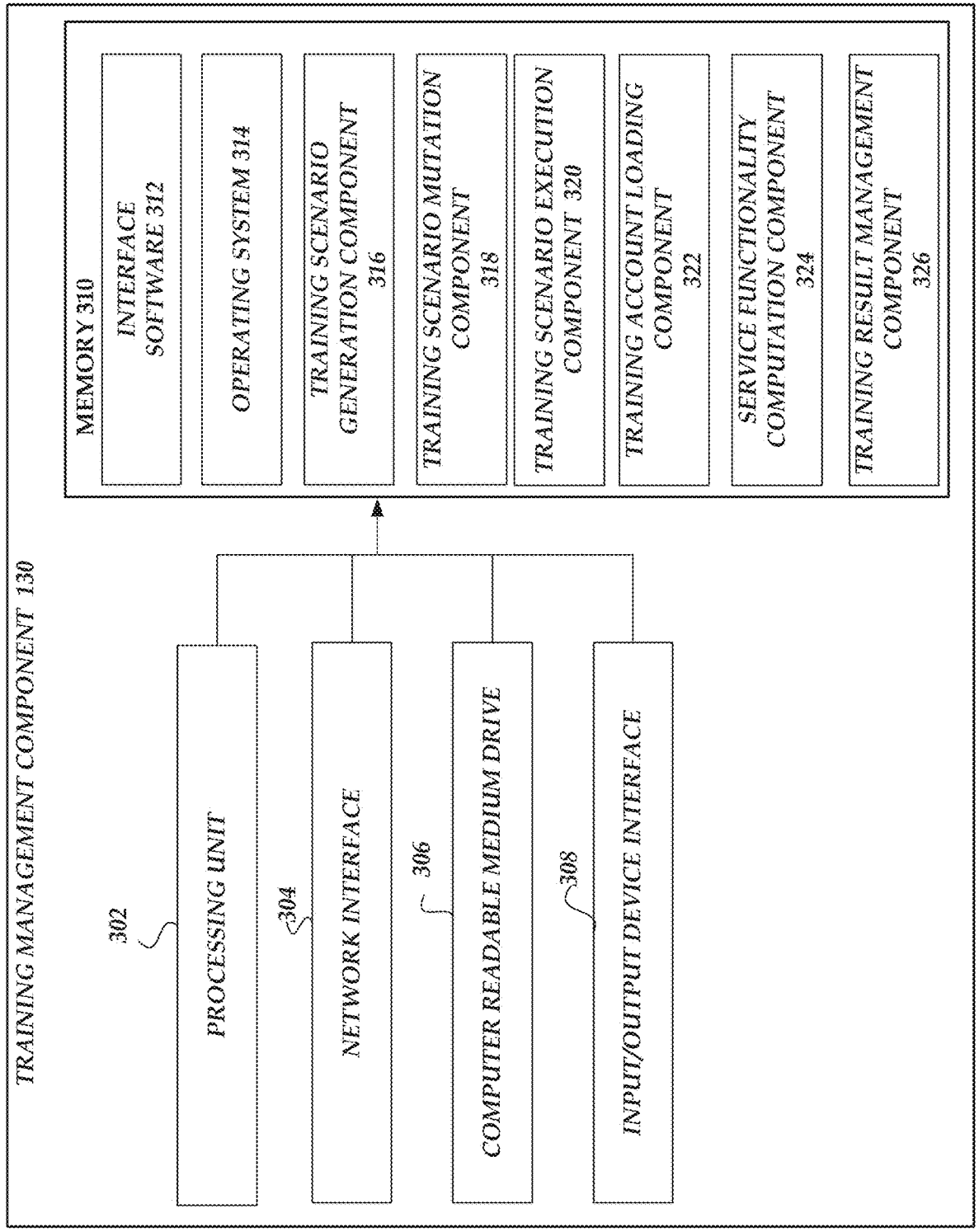
FIG. 3 depicts one embodiment of an architecture of an illustrative training management component.

FIG. 3 depicts one embodiment of an architecture of an illustrative training management component 130. The training management component 130 can be configured to generate training scenarios, execute the generated training scenario to be performed as workflow, perform service functionality computation, detect one or more issues, perform corrective actions, and provide corrective action reports. The general architecture of the training management component 130 may include an arrangement of computer hardware and software components that may be used to implement aspects of the present disclosure. As illustrated, the training management component 130 includes a processing unit 302, a network interface 304, a computer-readable medium drive 306, and an input/output device interface 308, all of which may communicate with one another by way of a communication bus. The training management component 130 may be physical hardware components or implemented in a virtualized environment.

The network interface 304 may provide connectivity to one or more networks or computing systems, such as the network 106 of FIGS. 1A, 1B. The processing unit 302 may thus receive information and instructions from other computing systems or services via a network. The processing unit 302 may also communicate to and from memory 310 and further provide output information for an optional display via the input/output device interface 308. In some embodiments, the training management component 130 may include more (or fewer) components than those shown in FIG. 3.

The memory 310 may include computer program instructions that the processing unit 302 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the training management component 130. The memory 310 may further include computer program instructions and other information for implementing aspects of the present disclosure. For example, in one embodiment, the memory 310 includes interface software 312 for communicating with other components or services.

The memory may include a training scenario generation component 316. In some embodiments, an administrator (e.g., a trainer, a developer, a service manager) can provide the training scenario to the training scenario generation component 316. In some embodiments, the training scenario generation component 316 can provide the scenarios based on the historical usage of the service customer and/or historical service usage scenarios provided to the service operators. For example, if a service operator successfully performs a service functionality computation of a scenario, this scenario can be generated (e.g., replicated).

In some embodiments, the training scenario generation component 316 can group the scenarios. Illustratively, a group of scenarios can be grouped and characterized as scenarios that can render an error or failure during the service functionality computation. Thus, the service operator needs to perform one or more corrective actions to resolve the error or failure. For example, these scenarios can include but are not limited to "no payment instrument on file," "resuming billing for a skip account," "account issues on tax and billing," "expired offer," "pricing plan removal," etc. In some embodiments, the one or more of these scenarios can be included in the training scenario and cause an error or issue when the service operator performs the service functionality computation based on the training scenario.

In some embodiments, the training scenario generation component 316 can determine an expected corrective answer to be performed by the service operator. For example, when a scenario, "no payment instrument on file,"

is included in the training scenario, the expective corrective answer can be "contact service account user and receive payment instrument" or "convert the account billing as invoice." In some embodiments, the training management component 130 can provide a number of attempts for the service operator to determine the corrective answer. In some embodiments, the training scenario generation component 316 may expect that no corrective answer existed and only provide a number of attempts. In some embodiments, the training scenario generation component 316 can specify time duration to determine the corrective answer.

The memory 310 may further include training scenario mutation component 318. The training scenario mutation component 318 can generate scenarios by varying one or more attributes of the scenarios. For example, the training scenario mutation component 318 may replicate a training scenario and changes one or more attribute of the replicated scenario. For example, a training scenario can be replicated, and the variable scenario, such as "pricing plan removal," can be added to the replicated scenario. In this example, adding the variable scenario may require modifying the attribute of the replicated scenario, where the attribute is related to the pricing plan.

In some embodiments, the training scenario mutation component 318 may perform training scenario mutation by modifying the attribute of the scenario that causes an issue or failure during the service functionality computation. For example, the training scenario mutation component 318 may add the "pricing plan removal." Thus, when the service operator is performing the service functionality computation, the service operator may detect an issue or error due to the "pricing plan removal."

In some embodiments, the training scenario mutation component 318 dynamically updates the attribute in the training scenario. For example, when a service operator attempts 3 times and fails to complete the service functionality computation, the training scenario mutation component 318 may change another attribute of the training scenarios. For example, when a training scenario includes a scenario, such as "pricing plan removal," the service operator may fail to complete the service functionality computation. In this example, the training scenario mutation component 318 can modify attributes to add the pricing plan in the training scenario and modify other attributes to add a scenario, such as "no payment instrument on file." These examples are provided merely as examples, and the training scenario mutation component 318 can continuously change the training scenario by mutating its attributes to modify the partial scenario of the training scenario.

In some embodiments, the training scenario mutation component 318 can mutate the training scenario by providing a customized input. In these embodiments, the attributes in the scenario can be partitioned as universal attributes and customizable attributes. For example, the universal attribute can include the attributes included in all use cases related to the service, such that if the service requires a connection fee regardless of price plan or offer, the connection fee can be the universal attribute. The customizable attribute, for example, can include the attributes that should be customized. For example, if the price plan is different across the regions, the different price plans should be included in the attributes of scenarios in respective to the region.

In some embodiments, the training scenario mutation component 318 monitors the training scenario mutation by tracking changes in the attributes of the training scenario.

The memory 310 may further include the training scenario execution component 320. In some embodiments, the training scenario execution component 320 obtains training scenarios from the training scenario mutation component 318 and executes the training scenario. In some embodiments, the training scenario execution component 320 may utilize other services such as a database service, an object storage service, etc. These components may be implemented as software, hardware, or a combination of both using one or more multiple computing devices located at one or more multiple locations provided by the network service provider 110.

The memory 310 may further include training account loading component 322. In some embodiments, the training account loading component 322 may generate various account profiles that can be used when the service operators perform the service functionality computation. In these embodiments, the training account loading component 322 may obtain account information from the network service provider 110, such that the user account information is stored in the database 116. The account information may include the necessary account information to perform the service functionality computation based on the generated scenarios. The necessary account information can include account identification, tax rate, billing cycle, service price plan, offer, etc. In some embodiments, the training account loading component 322 can generate account information and replicate it into a certain number of accounts. For example, the training account loading component 322 may obtain an account from the network service provider 110 and replicate the account into more than one replicated account. Each replicated account can be associated with a different scenario, and the service operator can perform the service functionality computation by using the replicated accounts and the generated scenarios. For example, if an account is replicated into 10 accounts, each replicated account can be utilized as the account information for 10 different scenarios.

The memory 310 may further include training bill computation component 324. In some embodiments, the service operator can perform the service functionality computation by using the training scenario and account information. In some embodiments, the service functionality computation can generate issues or errors. For example, if the training scenario includes a scenario such as "no payment instrument," an error can be occurred due to the "no payment instrument." In this example, the service operator can perform corrective actions. For example, the service operator can perform the corrective action by referencing standard operation references or troubleshooting documents provided by the network service provider 110. In some embodiments, performing the corrective action can result generating the invoicing and processing payments.

The memory 310 may further include training result management component 326. In some embodiments, the training result management component 326 may track or monitor the analysis behavior (e.g., corrective actions performed by the service operator) of the service operators. The analysis behavior can refer to the corrective action performed by the service operator to resolve an issue or error detected during the service functionality computation. For example, the training result management component 326 may monitor the corrective actions performed by the service operator by determining service functionality computation time, the number of attempts to detect the issue, steps to resolve the billing issue, etc. In some embodiments, the training result management component 326 may track the corrective action performed by the service operators based on criteria. Illustratively, the service training management component may include criteria defined by network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application. In some embodiments, the training result management component 326 provides the analysis behavior (e.g., corrective actions performed by the service operator) in the form of mean time to repair (MTTR). For example, the MTTR can represent the amount of time the service operator corrected issue or error detected during the service functionality computation.

Figure 4A:
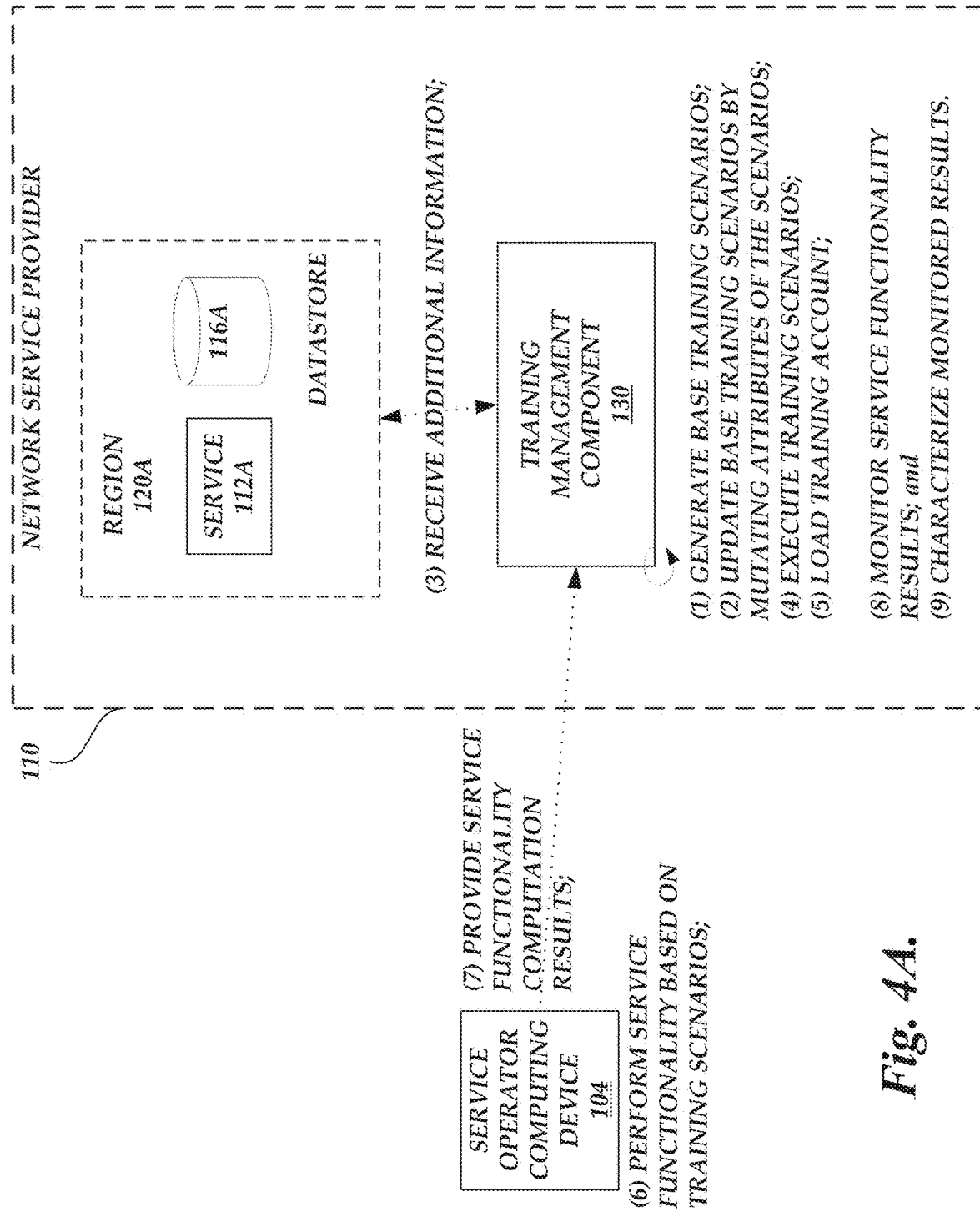
FIG. 4A is an illustrative interaction of training service operators.

With reference to FIG. 4A, an illustrative interaction of training the service operator, will be described. The interaction is illustrative. At (1), the training management component 130 generates base training scenarios. In some embodiments, an administrator (e.g., a trainer, a developer, a service manager) can provide the training scenario to the training management component 130. In some embodiments, the training management component 130 can generate the training scenario based on scenarios used in the real-world scenario, such as historical usage of the service customer and/or historical service usage scenarios provided to the service operators. For example, if a service operator successfully performs a service functionality computation in a real-world scenario, this real-world scenario can be replicated and stored in the database 116 (shown in FIG. 1A). Then, the training management component 130 may replicate scenarios and store them in the training scenarios data store 214.

In some embodiments, the training management component 130 can group the scenarios. Illustratively, a group of scenarios can be grouped and characterized as scenarios that can render an error or failure during the service functionality computation (e.g., service functionality computation). Thus, the service operator needs to perform one or more corrective actions to resolve the error or failure. For example, these scenarios can include but is not limited to "no payment instrument on file," "resuming billing for a skip account," "account issues on tax and billing," "expired offer," "pricing plan removal," etc.

At (2), the training management component 130 updates the base training scenarios by mutating attributes of the scenarios. The training management component 130 can mutate the scenarios by varying one or more attributes of the scenarios. For example, the training management component 130 may replicate a training scenario and changes one or more attribute of the replicated scenario. For example, in an example of billing service, an attribute, such as "pricing plan removal" can be added to the replicated scenario.

In some embodiments, the training management component 130 dynamically updates attribute in the training scenario. For example, when a service operator attempts 3 times and fails to complete the service functionality computation, the training management component 130 may change another attribute of the training scenarios. For example, when a training scenario includes a scenario, such as "pricing plan removal," the service operator may fail to complete the service functionality computation. In this example, the training management component 130 can modify attributes to add the pricing plan in the training scenario and modify other attributes to add a scenario, such as "no payment instrument on file." These examples are provided merely as examples, and the training management component 130 can continuously change the training scenario by mutating its attributes to modify the partial scenario of the training scenario.

In some embodiments, the attributes in the scenario can be partitioned as universal attributes and customizable attributes, and the training management component 130 may mutate the customizable attributes. For example, the universal attributes can include the attributes included in all use cases related to the service, such that if the service requires a connection fee regardless of price plan or offer, the connection fee can be the universal attribute. The customizable attribute, for example, can include the attributes that should be customized. For example, if the price plan is different across the regions, the different price plans should be included in the attributes of scenarios respective to the region. In some embodiments, the customizable attribute is not limited to the region and can include customizable attributes between groups of people who use the services.

At (3), the training management component 130 receives additional information, such as regional information. In some embodiments, the training management component 130 can mutate the training scenario based on the additional information. For example, in a billing service, the training management component 130 receives billing information specific to a region where the service is provided. For example, the billing information can include customized attributes, such as tax rate, service pricing, offer in the region, currency, etc. In some embodiments, the process (3) is optional.

At (4), the training management component 130 executes the training scenario. In some embodiments, the training management component 130 obtains training scenarios from the database 116 and executes the training scenario. In some embodiments, the training management component 130 may utilize other services such as a database service, an object storage service, etc. These components may be implemented as software, hardware, or a combination of both using one or more multiple computing devices located at one or more multiple locations provided by the network service provider 110.

In some embodiments, the training management component 130 can determine an expected corrective answer to be performed by the service operator when the service operator detects an issue or error during the service functionality computation. In some embodiments, these corrective answers can be provided by the network service provider, administrator, developer, etc. For example, when a scenario, "no payment instrument on file," is included in the training scenario, the expective corrective answer can be "contact service account user and receive payment instrument" or "convert the account billing as insights." In some embodiments, the training management component 130 can provide a number of attempts for the service operator to determine the corrective answer. In some embodiments, the training management component 130 may expect that no corrective answer existed and only provide a number of attempts. In some embodiments, the training management component 130 can specify time duration to determine the corrective answer.

At (5), the training management component 130 loads training account. In some embodiments, the training management component 130 may generate various account profiles that can be used when the service operators perform the service functionality computation. In these embodiments, the training management component 130 may obtain account information from the network service provider 110, such that the user account information is stored in the database 116. The account information may include the necessary account information to perform the service functionality computation based on the generated scenarios. The necessary account information can include account identification, tax rate, billing cycle, service price plan, offer, etc. In some embodiments, the training management component 130 can generate account information and replicate it into a certain number of accounts. For example, the training management component 130 may obtain an account from the network service provider 110 and replicate the account into more than one replicated account. Each replicated account can be associated with a different scenario, and the service operator can perform the service functionality computation by using the replicated accounts and the generated scenarios. For example, if an account is replicated into 10 accounts, each replicated account can be utilized as the account information for 10 different scenarios.

In some embodiments, the training management component 130 may generate services that require functionality computation by the service operators. In some embodiments, the training management component 130 may provide services associated with the training scenarios. Thus, the training management component 130 can provide the service user account information and the services to be used for the service functionality computation by the service operators.

At (6), the service operator performs service functionality computation based on the training scenarios. In some embodiments, the service operator can perform the service functionality computation by using the training scenario, the services associated with the scenario, and the account information of the user of the service. In some embodiments, the service functionality computation can generate issue or error. For example, if the training scenario includes a scenario such as "no payment instrument," an error can be occurred due to the "no payment instrument." In this example, the service operator can perform corrective actions. For example, the service operator can perform the corrective action by referencing standard operation references or troubleshooting documents provided by the network service provider 110. In some embodiments, performing the corrective action can result generating the invoicing and processing payments.

At (7), the service operator computing device 104 provides service functionality computation results. In some embodiments, the service functionality computation results performed by the service operators can be shared with local service operators in the form of evaluation results.

At (8), the training management component 130 may monitor the service functionality results by analyzing analysis behavior (e.g., corrective actions performed by the service operator) of the service operators. The analysis behavior can refer to the corrective action performed by the service operator to resolve an issue or error detected during the service functionality computation. For example, the training management component 130 may monitor the corrective actions performed by the service operator by determining service functionality computation time, the number of attempts to detect the issue, steps to resolve the billing issue, etc. In some embodiments, the training management component 130 may track the corrective action performed by the service operators based on criteria. Illustratively, the service training management component 130 may include criteria defined by the network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application. In some embodiments, the training management component 130 provides the analysis behavior (e.g., corrective actions performed by the service operator) in the form of mean time to repair (MTTR). For example, the MTTR can represent the amount of time the service operator corrected issue or error detected during the service functionality computation. In some embodiments, the training management component 130 provides feedback to the service operators. The feedback can be generated based on the monitoring results of the corrective actions performed by the service operator.

At (9), the training management component 130 may characterize the monitored results. In some embodiments, the training management component 130 characterizes the results to update the training scenario and/or provide feedback to the service operators. In some embodiments, the training management component 130 may identify one or more attributes that rendered the error in the service functionality computation. In these embodiments, the training management component 130 may update the training scenario. For example, the training management component 130 can modify the attributes that cause the error; add another one or more attributes; modify customer account information used for the training; modify types of service; modify regional information; etc. In some embodiments, the training management component 130 can provide feedback to the service operators. The feedback can be a recommendation when the service operators are performing the service functionality computation in scenarios similar to the training scenarios.

Figure 4B:
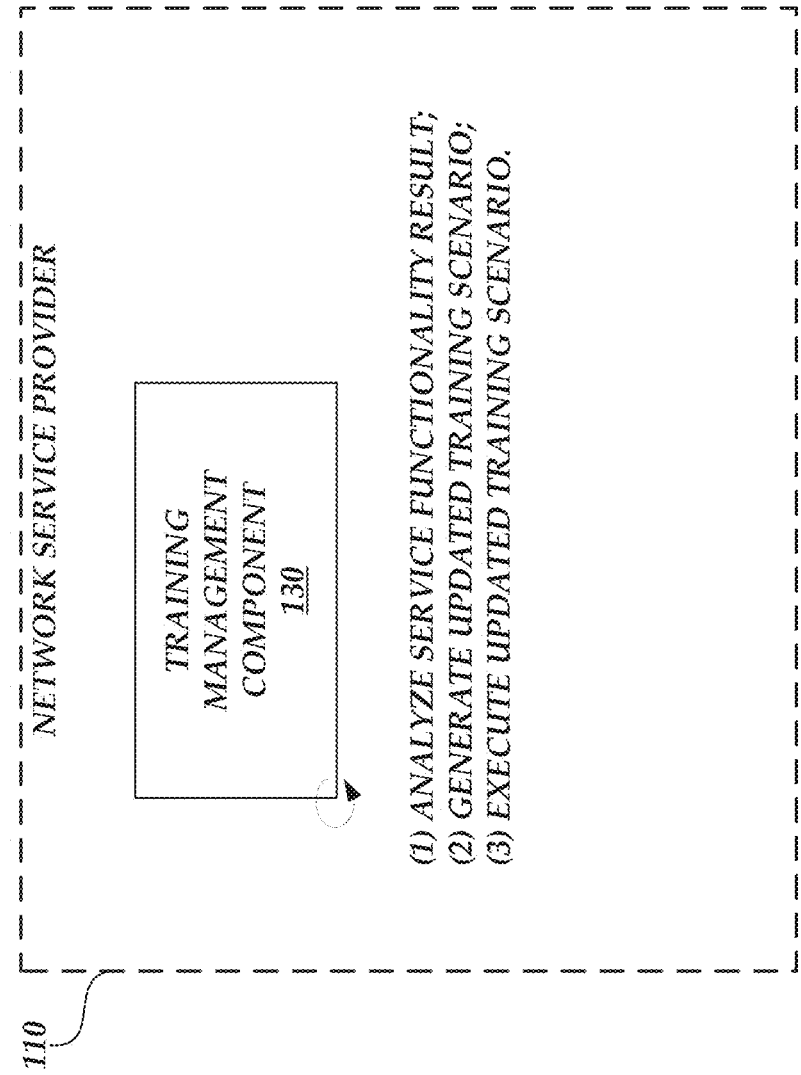
FIG. 4B is an example of an illustrative interaction of training service operators.

Turning now to FIG. 4B, an example of an illustrative interaction of training the service operator, will be described. The interaction shown in FIG. 4B describes an example of continuously providing training scenarios that renders a failure when the service operator performs the service functionality computation.

At (1), the training management component 130 analyzes the service functionality computation results provided in (7) of FIG. 4A. In some embodiments, the result indicates that the service operator did not resolve the error or issue detected during the service functionality computation. In these embodiments, the training management component 130 can track the corrective actions performed by the service operator and store the corrective actions in the training scenarios data store 214.

At (2), the training management component 130 generates an updated training scenario. In some embodiments, the training management component 130 can modify the training scenario that renders a failure to the service operator. In some embodiments, the updated training scenario can also be configured to render the failure to the service operator.

At (3), the training management component 130 executes the updated training scenario. In some embodiments, the training management component 130 obtains training scenarios from the database 116 and executes the training scenario. In some embodiments, the training management component 130 may utilize other services such as a database service, an object storage service, etc. These components may be implemented as software, hardware, or a combination of both using one or more multiple computing devices located at one or more multiple locations provided by the network service provider 110.

Figure 5:
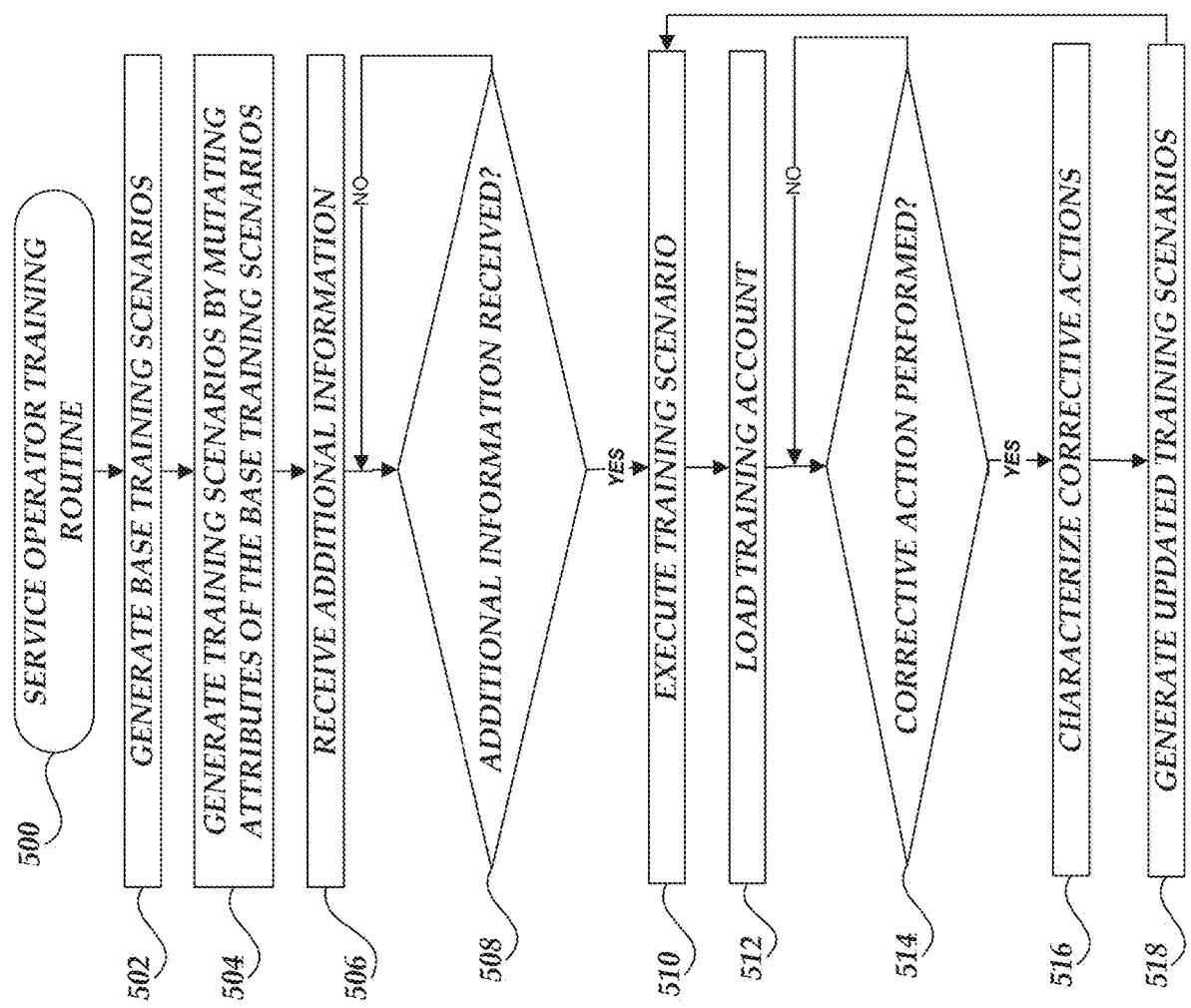
FIG. 5 is a flow diagram illustrative of a routine for training service operators.

Turning now to FIG. 5, a routine 500 for training service operator routine utilizing training management component 130 will be described.

At block 502, the training management component 130 generates base training scenarios. In some embodiments, an administrator (e.g., a trainer, a developer, a service manager) can provide the training scenario to the training management component 130. In some embodiments, the training management component 130 can generate the training scenario based on scenarios used in the real-world scenario, such as historical usage of the service customer and/or historical service usage scenarios provided to the service operators. For example, if a service operator successfully performs a service functionality computation in a real-world scenario, this real-world scenario can be replicated and stored in the database 116 (shown in FIG. 1A). Then, the training management component 130 may replicate scenarios and store them in the training scenarios data store 214.

In some embodiments, the training management component 130 can group the scenarios. Illustratively, a group of scenarios can be grouped and characterized as scenarios that can render an error or failure during the service functionality computation (e.g., service functionality computation). Thus, the service operator needs to perform one or more corrective actions to resolve the error or failure. For example, these scenarios can include but are not limited to "no payment instrument on file," "resuming billing for a skip account," "account issues on tax and billing," "expired offer," "pricing plan removal," etc.

At block 504, the training management component 130 generates training scenarios by mutating attributes of the base training scenarios. The training management component 130 can generate scenarios by varying one or more attributes of the scenarios. For example, the training management component 130 may replicate a base training scenario and changes one or more attribute of the replicated scenario. For example, a training scenario can be replicated, and the variable scenario, such as "pricing plan removal," can be added to the replicated scenario.

In some embodiments, the training management component 130 dynamically updates attribute in the training scenario. For example, when a service operator attempts 3 times and fails to complete the service functionality computation, the training management component 130 may change another attribute of the training scenarios. For example, when a training scenario includes a scenario, such as "pricing plan removal," the service operator may fail to complete the service functionality computation. In this example, the training management component 130 can modify attributes to add the pricing plan in the training scenario and modify other attributes to add a scenario, such as "no payment instrument on file." These examples are provided merely as examples, and the training management component 130 can continuously change the training scenario by mutating its attributes to modify the partial scenario of the training scenario.

In some embodiments, the attributes in the scenario can be partitioned as universal attributes and customizable attributes, and the training management component 130 may mutate the customizable attributes. For example, the universal attributes can include the attributes included in all use cases related to the service, such that if the service requires a connection fee regardless of price plan or offer, the connection fee can be the universal attribute. The customizable attribute, for example, can include the attributes that should be customized. For example, if the price plan is different across the regions, the different price plans should be included in the attributes of scenarios in respective to the region. In some embodiments, the customizable attribute is not limited to the region and can include customizable attributes between groups of people who use the services.

At block 506, the training management component 130 receives additional information, such as a regional information. In some embodiments, the training management component 130 can mutate the training scenario based on the additional information. For example, in a billing service, the training management component 130 receives billing information specific to a region where the service is provided. For example, the billing information can include customized attributes, such as tax rate, service pricing, offer in the region, currency, etc.

At block 508, the training management component 130 determines whether the additional information is received. If the training management component 130 received the additional information, the routine proceeds to block 510. However, if the training management component 130 did not receive the billing information, the routing stays at block 508. In some embodiments, the blocks 506 and 508 are optional.

At block 510, the training management component 130 executes the training scenario. In some embodiments, the training management component 130 obtains training scenarios from the database 116 and executes the training scenario. In some embodiments, the training management component 130 may utilize other services such as a database service, an object storage service, etc. These components may be implemented as software, hardware, or a combination of both using one or more multiple computing devices located at one or more multiple locations provided by the network service provider 110.

In some embodiments, the training management component 130 can determine an expected corrective answer to be performed by the service operator when the service operator detects an issue or error during the service functionality computation. In some embodiments, these corrective answers can be provided by the network service provider, administrator, developer, etc. For example, when a scenario, "no payment instrument on file," is included in the training scenario, the expective corrective answer can be "contact service account user and receive payment instrument" or "convert the account billing as insights." In some embodiments, the training management component 130 can provide a number of attempts for the service operator to determine the corrective answer. In some embodiments, the training management component 130 may expect that no corrective answer existed and only provide a number of attempts. In some embodiments, the training management component 130 can specify time duration to determine the corrective answer.

At block 512, the training management component 130 loads the training account. In some embodiments, the training management component 130 may generate various account profiles that can be used when the service operators perform the service functionality computation. In these embodiments, the training management component 130 may obtain account information from the network service provider 110, such that the user account information is stored in the database 116. The account information may include the necessary account information to perform the service functionality computation based on the generated scenarios. The necessary account information can include account identification, tax rate, billing cycle, service price plan, offer, etc. In some embodiments, the training management component 130 can generate account information and replicate it into a certain number of accounts. For example, the training management component 130 may obtain an account from the network service provider 110 and replicate the account into more than one replicated accounts. Each replicated account can be associated with a different scenario, and the service operator can perform the service functionality computation by using the replicated accounts and the generated scenarios. For example, if an account is replicated into 10 accounts, each replicated account can be utilized as the account information for 10 different scenarios. In some embodiments, the training management component 130 may also load services that require functionality computation by the service operators. In some embodiments, the training management component 130 may provide services associated with the training scenarios. Thus, the training management component 130 can provide the service user account information and the services to be used for the service functionality computation by the service operators.

At block 514, the training management component 130 determines whether the service operator performed corrective actions. If the service operator performed corrective actions, the routine proceeds to block 516. However, if the service operator does not perform corrective actions, the routine stays at block 514.

At block 516, the training management component 130 characterizes the corrective actions. For example, the training management component 130 may monitor the corrective actions performed by the service operator by determining service functionality computation time, the number of attempts to detect the issue, steps to resolve the billing issue, etc. In some embodiments, the training management component 130 may monitor the corrective action performed by the service operators based on criteria. Illustratively, the service training management component may include criteria defined by network service provider, administrator, developer, etc. For example, the criteria can be the scope of the service operator's behavior for resolving the service functionality computation failure or issue and/or the number of attempts to resolve the failure or issue. Illustratively, the criteria can be "resolving the service functionality computation error with a correct solution," "generating recommendations to resolve the computation error," "resolving the service functionality computation error within 3 attempts," or "generating recommendations within 3 attempts." These criteria are provided as examples, and the scope and number of attempts can be modified based on the specific application. In some embodiments, the training management component 130 provides the analysis behavior (e.g., corrective actions performed by the service operator) in the form of mean time to repair (MTTR). For example, the MTTR can represent the amount of time the service operator corrected an issue or error detected during the service functionality computation. In some embodiments, the training management component 130 provides feedback to the service operators. The feedback can be generated based on the monitoring results of the corrective actions performed by the service operator.

At block 518, the training management component 130 generates updated training scenarios. In some embodiments, the training management component 130 can modify the training scenario that renders a failure to the service operator. In some embodiments, the updated training scenario can also be configured to render the failure to the service operator in the service functionality computation. After updating the training scenario, the routine 500 returns to block 510.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or stage machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without customer input or prompting, whether these features, elements and/or steps are included or are to be performed in any particular embodiment.

Disjunctive language such as the phrase "at least one of X, Y, or Z," unless specifically staged otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly staged, articles such as "a" or "an" should generally be interpreted to include one or more described items. Accordingly, phrases such as "a device configured to" are intended to include one or more recited devices. Such one or more recited devices can also be collectively configured to carry out the staged recitations. For example, "a processor configured to carry out recitations A, B, and C" can include a first processor configured to carry out recitation A working in conjunction with a second processor configured to carry out recitations B and C.

What is claimed:

1. A system for providing network system training, the system comprising:
   one or more computing processors and memories for executing computer-executable instructions to implement a training management component, wherein the training management component is configured to:
   generate, for one or more microservices of a set of microservices, a training scenario, wherein each microservice of the set of microservices is configured to provide underlying functionality to one or more network-hosted applications hosted by a service operator, and wherein the training scenario is provided to the service operator via the network-hosted application hosted by the service operator;
   mutate, by using a training scenario mutation platform included in the training management component, the training scenario by modifying one or more attributes of the training scenario to cause a generated error when executing the mutated training scenario, and wherein the generated error causes one or more functionality errors of the one or more network-hosted applications that execute the mutated training scenario;
   execute the mutated training scenario;
   load a training account and service information, wherein the service operator performs service computations by using the training account, the service information, and the mutated training scenario;
   determine corrective actions performed by the service operator; and
   analyze the corrective actions to automatically characterize a performance of the service operator.

2. The system as recited in claim 1, wherein the training management component is further configured to:
   in response to analyzing the corrective actions, generate an updated training scenario;
   load updated training account, wherein the service operator performs service functions by using the updated training account and the updated training scenario;
   determine second corrective actions performed by the service operator; and
   analyze the second corrective actions.

3. The system as recited in claim 1, wherein the training scenario is generated based on profile information recalled from a customer data store.

4. The system as recited in claim 1, wherein the modification of the one or more attributes renders an error when the service operator performs service functions.

5. The system as recited in claim 4, wherein the corrective action is performed to resolve the error.

6. The system as recited in claim 1, wherein the training management component further configured to store expected corrective actions, and wherein the training management component analyze the corrective actions based on the expected corrective actions.

7. The system as recited in claim 1, wherein the training management component generates analyzed results of the corrective action, comprising service functionality computation time, number of attempt to detect an issue, and steps to resolve the generated error.

8. The system as recited in claim 7, wherein the training management component generates a feedback based on the analyzed results, wherein the system train the service operator based on the feedback, and wherein the system further update the training scenario based on the feedback.

9. The system as recited in claim 1, wherein the system further comprising a machine learned model configured to continuously generate updated training scenarios and monitor a behavior of the service operator for identifying the corrective actions.

10. The system as recited in claim 1, wherein the mutated training scenario is stored in a database, and wherein the database is provided as a data object storage service.

11. A system for providing service operator training for network-based services, the system comprising:
    one or more computing processors and memories for executing computer-executable instructions to implement a training management component, wherein the training management component is configured to:
    generate, for one or more microservices of a set of microservices, a service operator scenario, wherein each microservice of the set of microservices is configured to provide underlying functionality to one or more network-hosted applications hosted by a service operator, and wherein the service operator scenario is provided to the service operator as a training scenario based on a generated error in the training scenario via the network-hosted application hosted by the service operator;
    mutate, by using a training scenario mutation platform included in the training management component, the training scenario by modifying one or more attributes of the training scenario to cause the generated error when executing the mutated training scenario, and wherein the generated error causes one or more functionality errors of the one or more network-hosted applications that execute the mutated training scenario; and automatically cause the mutated training scenario to be executed to elicit tracking of the service operator.

12. The system as recited in claim 11, wherein the modification of the one or more attributes renders an error when the service operator performs a service functionality based on the generated error in the training scenario.

13. The system as recited in claim 12, wherein the training management component provides expected corrective actions when the service operator detects the error during the service functionality.

14. The system as recited in claim 11, wherein the training management component continuously modifies the one or more attributes of the training scenario.

15. The system as recited in claim 11, wherein the training management component executes a workflow, and wherein the service operator performs service functionality using the workflow.

16. The system as recited in claim 15, wherein the workflow comprises of an account information loading stage, and wherein the account information is associated service user information.

17. The system as recited in claim 11, wherein the training management component modifies the one or more attributes based on universal and customized attributes.

18. A computer-implemented method for providing service operator training for network-based services, the method comprising:

generating, for one or more microservices of a set of microservices, a training scenario, wherein each microservice of the set of microservices is configured to provide underlying functionality to one or more network-hosted applications hosted by a service operator, and wherein the training scenario is provided to the service operator as a training scenario related to attempted correction of a generated error in the training scenario via the network-hosted application hosted by the service operator;

mutating, by using a training scenario mutation platform, the training scenario by modifying one or more attributes of the training scenario to cause a generated error when executing the mutated training scenario, and wherein the generated error causes one or more functionality errors of the one or more network-hosted applications that execute the mutated training scenario;

executing the mutated training scenario;

loading training account, wherein the service operator performs service functionality by using the mutated training scenario to resolve the generated error;

determining corrective actions performed by the service operator; and characterizing the corrective actions.

19. The computer-implemented method of claim 18, wherein the method further comprising:

in response to analyzing the corrective actions, generating an updated training scenario;

loading updated training account information, wherein the service operator performs service functionality by using the updated training account and the updated training scenario;

determining second corrective actions performed by the service operator; and analyzing the second corrective actions.

20. The computer-implemented method of claim 18, wherein the training scenario is generated user profile information.

21. The computer-implemented method of claim 18, wherein the modification of the one or more attributes renders an error when the service operator performs the service functionality.

22. The computer-implemented method of claim 18, wherein the method further comprising storing expected corrective actions, and wherein the method further comprising analyzing the corrective actions based on the expected corrective actions.

23. The computer-implemented method of claim 18, wherein the method further comprising generating analyzed results of the corrective action, the analyzed results comprising service computation time, number of attempts to detect an issue, and steps to resolve the generated error.

* * * * *